United States Patent [19]

Pagano

[11] 4,359,190
[45] Nov. 16, 1982

[54] EXACT INVOLUTE PLY PATTERNS

[75] Inventor: Nicholas J. Pagano, Centerville, Ohio

[73] Assignee: The United States of America as represented by the Secretary of the Air Force, Washington, D.C.

[21] Appl. No.: 293,776

[22] Filed: Aug. 18, 1981

[51] Int. Cl.³ .................. B63H 11/00; B29C 11/00
[52] U.S. Cl. ..................... 239/265.11; 60/200 R; 29/157 C; 156/189; 156/222; 428/36
[58] Field of Search ............... 156/189, 190, 191, 192, 156/222; 60/200 A, 200 R, 271; 29/157 C; 239/265.15, 265.11; 428/36

[56] References Cited

U.S. PATENT DOCUMENTS

| | | | |
|---|---|---|---|
| 3,436,292 | 4/1969 | Hatch et al. | 156/222 |
| 3,449,189 | 6/1969 | Hatch | 60/271 |
| 3,700,535 | 10/1972 | McCoy | 156/189 |
| 3,701,704 | 10/1972 | Dervy | 156/297 |

*Primary Examiner*—William R. Dixon, Jr.
*Attorney, Agent, or Firm*—Donald J. Singer; Jacob N. Erlich

[57] ABSTRACT

A hollow symmetrical structure in the form of a preselected body of revolution, and a method of making same. The structure comprises a plurality of a predetermined number of identically shaped and sized exact involute surface plies which are successively disposed and joined circumferentially in a contacting, stack-like layered, and overlapping relationship. Each ply is made of the same material and with the same ply pattern which is configurated and structured such that the plies made from using it fit together prefectly and their respective boundaries form the preselected body of revolution, without the defects induced by the prior art, such as wrinkles and pattern distortion.

12 Claims, 8 Drawing Figures

EXACT INVOLUTE PLY PATTERNS

STATEMENT OF GOVERNMENT INTEREST

The invention described herein may be manufactured and used by or for the Government for governmental purposes without the payment of any royalty thereon.

BACKGROUND OF THE INVENTION

This invention relates to uniquely structured bodies of revolution and, more particularly, to exact involute ply patterns for use in constructing bodies of revolution from thin sheet material.

Involute construction, formerly known as rosette construction, is a popular approach being used in rocket nozzle technology for the fabrication of exit cones and other bodies of revolution. Such bodies are formed by laminating identical fabric-reinforced composite plies of uniform thickness in such a way that each ply extends to the extremities of the body in both the radial and axial directions. Hence, the boundaries of the body are completely defined by the ply edges. The prior art approach to involute construction incorporates the use of analysis and fabrication techniques that can lead to significant pre-existing flaw distributions within the body. Defects such as wrinkles and fabric distortion are induced and represent the suspected source of numerous failures that have occurred in test firings, and even in fabricated articles prior to imposed loadings. Regions of geometrical discontinuity, such as the neighborhood of a cylinder-cone intersection are particularly sensitive to the formation of this initial damage. The origin of many of these problems appears to lie in the use of an incorrect ply pattern, i.e., the basic ply geometry adopted does not satisfy the involute construction problem, which requires that a prescribed volume of revolution be filled precisely with a given number of identical plies of the same constant thickness.

What is needed in the art, and is not presently available, is the capability to fabricate a body of revolution having no gaps between plies and no wrinkles or distortion of the ply pattern, i.e., having a perfectly smooth and continuous surface.

SUMMARY OF THE INVENTION

The instant invention satisfies the above-mentioned need in the art. It, therefore, constitutes a significant advance in the state-of-the-art.

The instant invention is a predetermined (i.e., arbitrary) hollow symmetrical structure, in the form of a body of revolution, which comprises a preselected number of identically shaped and sized exact involute surface plies which are successively disposed and joined circumferentially in a contacting, stack-like layered, and overlapping relationship. The key to the success of the instant invention is the dimensioning and configuration of a ply pattern which allows the plies to fit together perfectly, in such a way that their boundaries form the desired body of revolution.

Accordingly, an object of this invention is to provide an initially flat ply pattern with which the necessary plurality of a preselected number of identically shaped and sized plies can be made to form the predetermined body of revolution. In this regard, it is to be noted that when this initially flat ply pattern is curved (to help form the body of revolution) it is called an "involute surface."

Another object of this invention is to provide an exact involute surface of each identical ply, wherein each exact involute surface has an inner edge, an outer edge, a limiting sized width, a limiting sized thickness, and a length extending from the inner surface of the predetermined body of revolution to the outer surface thereof.

Still another object of this invention is to provide an exact involute surface of each identical ply, wheein each ply can be positioned such that it extends from the top surface of the predetermined body of revolution to the bottom surface thereof.

A further object of this invention is to provide a hollow symmetrical structure, in the form of a predetermined body of revolution which comprises a plurality of a preselected number of the aforesaid exact involute surface plies which are successively disposed and joined circumferentially in a contacting, stack-like layered, and overlapping relationship.

Another further object of this invention is to provide the above-described surface of revolution which has no gaps between plies, no wrinkles or distortion of the ply pattern, and a perfectly smooth and continuous surface.

Still another further object of this invention is to provide the hereinabove-described body of revolution which is useable as part of a rocket nozzle, such as an exit cone.

Another object of this invention is to provide a body of revolution, which is useable as part of a rocket nozzle, by way of a greatly simplified and less costly structure, because heat distortion of the aforesaid constituent plies is no longer necessary.

Still another object of this invention is to provide a body of revolution, which is useable as part of a rocket nozzle, which is improved in material strength and is structurally reliable, as compared to the prior art.

Yet another object of this invention is to provide a unique method of fabricating a hollow symmetrical structure, in the form of a body of revolution that is useable as a rocket nozzle, from a plurality of a predetermined number of identical exact involute surface plies.

These objects of this invention, as well as other objects related thereto, will become readily apparent after a consideration of the description of the invention, together with reference to the contents of the Figures of the drawing.

DESCRIPTION OF THE PREFERRED EMBODIMENT

Figure 5:
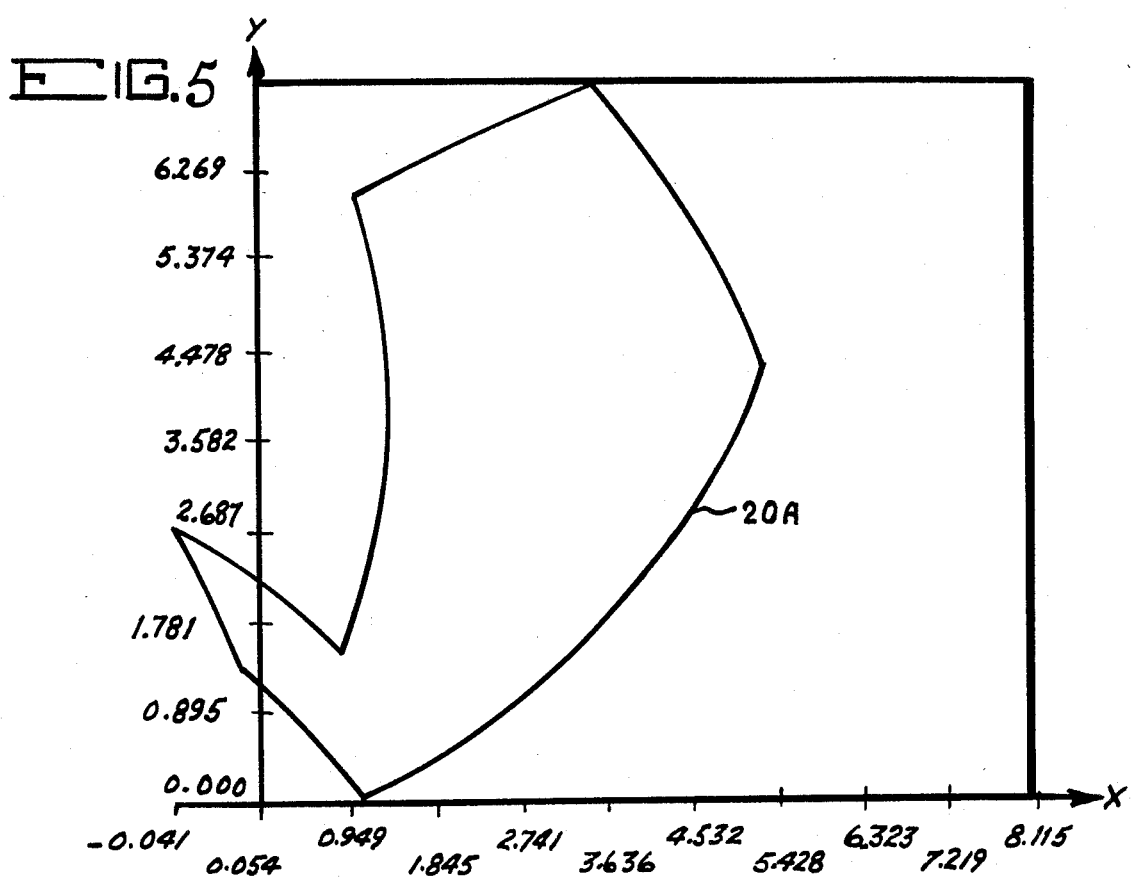
FIG. 5 is an exact involute ply pattern from which constituent identical ply members of the preferred embodiment can be made.
Figure 6:
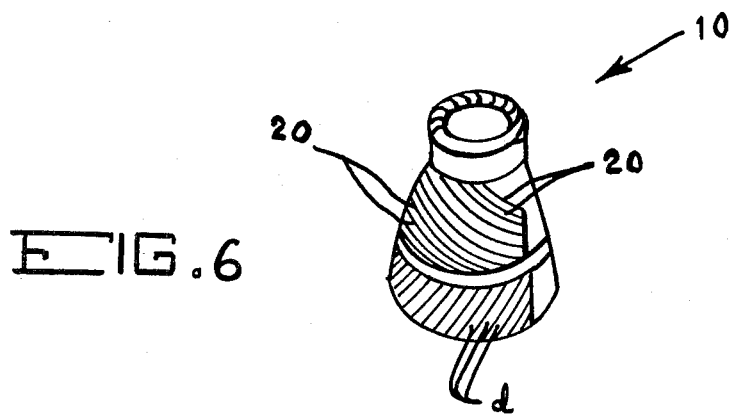
FIG. 6 is a perspective view, in simplified pictorial form, of the representative preferred embodiment (hereinbefore referred to) which comprises 92 identically shaped and sized exact involute surface plies, and which shows the result of practicing the steps of the method portion of the invention.

With reference to FIGS. 1-3, 5, and 6, therein is shown a representative preferred embodiment 10 of the instant invention in diverse views, and in whole or in part. In this regard, it is to be remembered that the instant invention 10 is any arbitrary body of revolution (and the method of making same) wherein the body of revolution comprises a plurality of a preselected number of identically shaped and sized exact involute surface plies which are successively disposed and joined circumferentially in a contacting, stack-like layered, and overlapping relationship, as best shown in FIG. 6, which will be discussed in detail later herein. It is also to be remembered that a body of revolution is a symmetrical 3-dimensional body having the shape which is defined and limited by rotating a planar curve about an axial straight line which is in the same plane as the curve, e.g., a sphere is generated by rotating a circle about a line (i.e., a diameter) in its plane. In accordance with the above definition, the resultant body of revolution not only is symmetrical, but also is centrally hollow. However, radially beyond the central hollow area, the body of revolution is solid.

In addition to the above, it is to be noted that the aforesaid body of revolution has inner and outer profile definitions and limitations, an inner surface, an outer surface, a top surface, and a bottom surface, and that each exact involute surface ply of the plurality of identical plies has a limiting sized thickness, a limiting sized width, and a length extending from the inner surface of the body of revolution to the outer surface thereof, with each ply positioned such that it extends from the top surface of the body of revolution to the bottom surface thereof.

In summary, my invention is any body of revolution which is structured in the above-described unique manner.

Solely for illustrative purposes, a representative preferred embodiment 10, FIGS. 1-3, 5 and 6, has been selected which is a body of revolution in the shape of an exit cone of a rocket nozzle. This selection is based upon the fact that a description and a depicting of a body of revolution of that shape can be readily understood by even those readers who are not of the art. It is to be understood and remembered that the instant invention 10 includes any body of revolution which is structured and/or made hereinbefore and hereinafter described and shown.

Additionally, since an exact involute ply pattern is basic to the instant invention 10, the manner in which the exact involute ply pattern is determined will be described and shown, such that the structuring and the constructing of the representative inventive body of revolution of revolution 10 by the use of a plurality of identical, exact involute, plies can be easily understood. In this regard, it is to be noted that each identical ply of the plurality shall be of a thickness T, shall extend from the inner surface to the outer surface of the body of revolution 10, and shall extend from the top plane of the body of revolution to the bottom plane thereof. It is also to be noted that this final curved configuration of the initially flat plies (made from a flat ply pattern) is called the "involute surface", as previously referred to herein.

Further, since the correctness of the approach (i.e., the successful making) of the above-described inventive body of revolution 10 has already been proved by constructing (i.e., fabricating) the body of revolution 10 by using exact involute plies (i.e., "layers") made of heavy paper, that structuring and that method of fabricating will be used to describe the inventive body of revolution 10 and the method of making same.

Also, those readers not of the art, are asked to note and to remember that the term "development" (or the like), as used herein, means the obtaining of a plane (i.e., two-dimensional) figure by "unfolding" the various surfaces of a three-dimensional figure onto a plane. A detailed description of "development" can be found in any descriptive geometry textbook.

Figure 1:
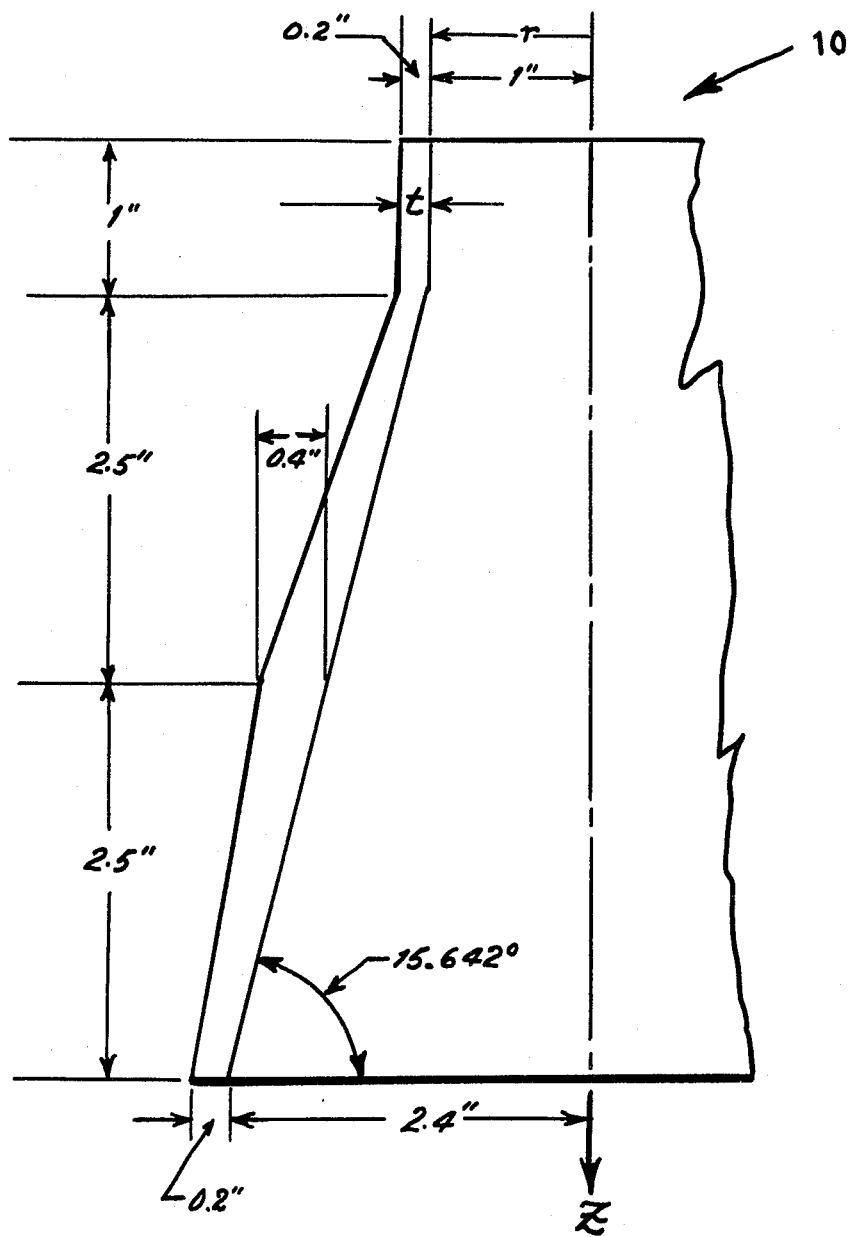
FIG. 1 is a side elevation view, in cross-section and partially fragmented of a representative preferred embodiment (i.e., a body of revolution in the form of an exit cone) of the invention.
Figure 2:
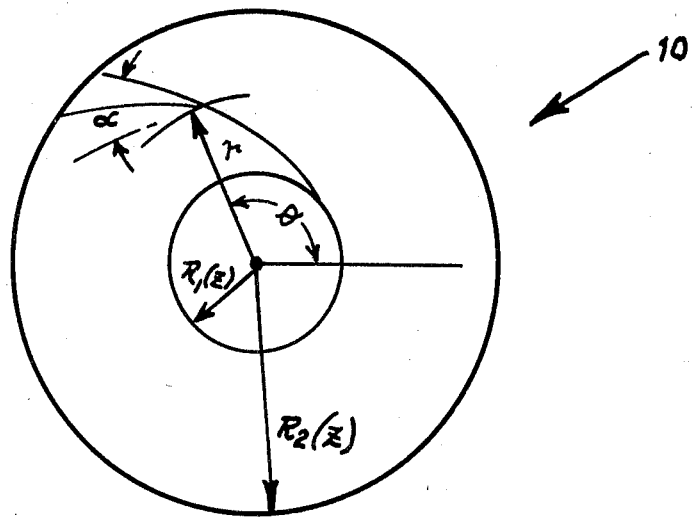
FIG. 2 is a top view, in schematic form, of the preferred embodiment, on which are shown some of the symbols which represent the nomenclature to be used hereinafter.

The nomenclature which will be used in the aforesaid description is as follows:

w = limiting sized width of each ply
N = preselected number of plies
T = preselected limiting sized thickness of each ply
c = involute constant, where $2\pi c \geq NT$
r, θ, z = radial, central angular, and axial coordinates, respectively (see FIG. 2)
α = arc angle (FIG. 2)
γ = tilt angle; $\tan \gamma = dr/dz$
s = arc length
$R_1(z), \bar{\theta}_1(z)$ = radial and central angular coordinates of inner edge of involute surface
$R_2(z), \bar{\theta}_2(z)$ = radial and central angular coordinates of outer edge of involute surface In order to design the ply pattern, the values of c, N, and T, in conjunction with the inner and outer profile definitions shown in FIG. 1, are needed. The heavy paper material employed here has a thickness T=0.1". The constants c and N are somewhat arbitrary, however, they must satisfy certain inequalities. One of these is given by $$2\pi c \geq NT \tag{1}$$

The remaining inequalities are discussed later. It will suffice for the present to note that N=92 and c=0.15 were used to constuct the body of revolution 10 shown in FIGS. 1, 2, and 6.

Figure 3:
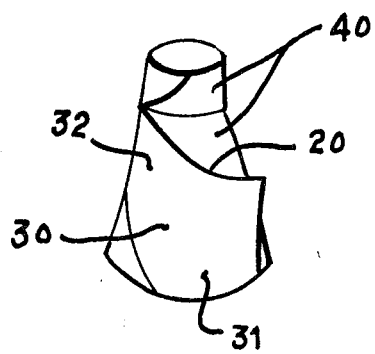
FIG. 3 is a perspective view, in simplified pictorial form, of one involute surface constituent member of the preferred embodiment, while this member is disposed on a male mandrel.

The following general relation is satisfied at all points on the exact involute surface 20, FIG. 3.

$$r \sin \alpha = c \tag{2}$$

which also requires that $$r \geq c \tag{3}$$

everywhere in the body. The exact involute surface 20, FIG. 3, is described by the locus of curves of the form $$\theta_2(z) - \theta_1(z) = \bar{\alpha}_1(z) + \cot \bar{\alpha}_1(z) - \bar{\alpha}_2(z) - \cot \bar{\alpha}_2(z) \quad (4)$$

Equation (4), which is valid for all values of z, along with eq. (2), establishes the relation between any two points $(r_1,\theta_1,z)$ and $(r_2,\theta_2,z)$ on z=constant and the respective values of $\alpha$ are $\alpha_1$ and $\alpha_2$.

The involute surface 20, FIG. 3, defined by eqs. (2) and (4) extends indefinitely in space. In order to form a given body of revolution 10, FIGS. 1, 2 and 6, the surface 20, FIG. 3, must be terminated along certain lines. For any value of z, the termination values of r are given by $R_1(z)$ and $R_2(z)$. These are precisely the profile radii defined in FIG. 1. Assuming the starting (top) value of z is $z_0$, the value of $\theta$ on the inner edge of the involute surface 20, FIG. 3, is given by $$\bar{\theta}_1(z) - \bar{\theta}_1(z_0) = \qquad (5)$$
$$Q(z - z_0) - \bar{\alpha}_1(z) - \cot \bar{\alpha}_1(z) + \bar{\alpha}_1(z_0) + \cot \bar{\alpha}_1(z_0)$$

where $$Q = \sqrt{\frac{4\pi^2 c^2 - N^2 T^2}{NcT}} \qquad (6)$$

The outer edge of the exact involute surface 20, FIG. 3, is defined by $R_2(z)$ and the respective angle $\bar{\theta}_2(z)$, where $$\bar{\theta}_2(z) - \bar{\theta}_1(z) = \bar{\alpha}_1(z) + \cot \bar{\alpha}_1(z) - \bar{\alpha}_2(z) - \cot \bar{\alpha}_2(z) \qquad (7)$$

and of course $$R_i(z) \sin \bar{\alpha}_i(z) = c (i=1,2) \qquad (8)$$

In these equations, the values of $z_0$ and $\bar{\theta}_1(z_0)$ are arbitrary. The values chosen were $z_0=0$ and $\bar{\theta}_1(z_0)=-\pi/2$. The remaining inequalities discussed earlier can now be expressed as $$\bar{\theta}_2(z) - \bar{\theta}_1(z) \leq 2\pi \qquad (9)$$

which must be satisfied for all values of z. Another inequality that is required in practical application is governed by the available width of the basic ply pattern material. An approximation of this criterion is established by calculating the arc length $\bar{s}$ of the curve joining the edges of the involute surface for all values of z. This arc length is given by $$\bar{s}(z) = \frac{R_2^2(z) - R_1^2(z)}{2c} \qquad (10)$$

The criterion is given by $$\bar{s}(z) \leq w \qquad (11)$$

where w is the width of material available.

The upper and lower extremities of the involute surface 20, FIG. 3, are given by eqs. (2) and (4), in which the extreme values z=0,6 are substituted. This completes the definition of the involute surface 20, FIG. 3.

It is now necessary to determine the flat sheet, or ply pattern, 20A, FIG. 5, from which the involute surface 20, FIG. 3, is generated. This requires "development" of the three-dimensional involute surface 20, FIG. 3. However, since this surface 20, FIG. 3, is doubly-curved, only an approximate development can be accomplished, although the present approximation is extremely accurate, especially for the usual case where arc angles $\alpha$ are small compared to unity.

To begin, x,y,z coordinates corresponding to the established r,$\theta$,z involute surface coordinates are defined. These are given by $$x = r \cos \theta$$
$$y = r \sin \theta \qquad (12)$$

The procedure consists of the analysis "strips" of the involute surface, i.e., the region defined by $$z_1 \leq z \leq z_2 \qquad (13)$$

Figure 4:
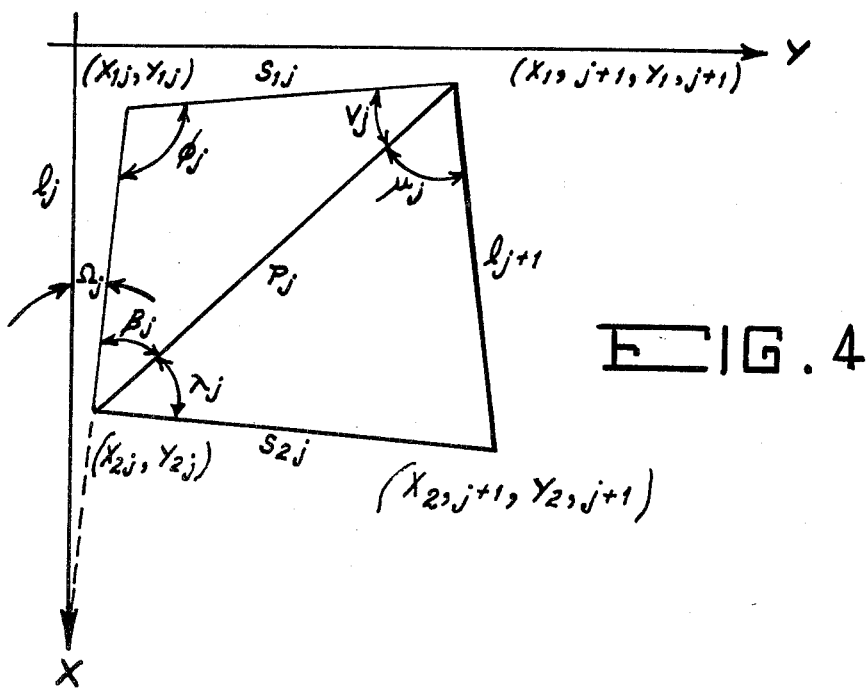
FIG. 4 is a representation of a developed (non-planar) quadrilateral which is pertinent to explaining this invention.

Within each strip meridians are positioned at various values of $\theta$. The position of a meridian is then denoted by a subscript, with the indices increasing consecutively from unity at the extremity of the inner surface within the strip to a maximum value at the extremity of the outer surface. Now introduce the notation $x_{ij}$, $y_{ij}$ to stand for the involute surface coordinates (calculated via eq. (12)) at the jth meridian and $z=z_i$, where i=1,2. Consecutive points are now connected according to the general scheme depicted in FIG. 4 to form a (non-planar) quadrilaterial. The network set up in this manner is used to represent the involute surface. Obviously, this representation becomes exact as j→∞ and $z_2-z_1$→0. In the development, or mapping, procedure then, the various lengths and angles shown in FIG. 4 are preserved. This mapping leads to plane coordinates $X_{ij}$, $Y_{ij}$, which are the transformed positions of $x_{ij}$, $y_{ij}$, respectively.

The equations that define the invariant quantities within a general quadrilateral shown in FIG. 4 are $$s_{ij} = [(x_{i,j+1} - x_{ij})^2 + (y_{i,j+1} - y_{ij})^2]^{\frac{1}{2}} \qquad (14)$$

$$l_j = [(x_{2j} - x_{1j})^2 + (y_{2j} - y_{1j})^2 + (z_2 - z_1)^2]^{\frac{1}{2}} \qquad (15)$$

$$\cos \phi_j = \frac{(x_{1,j+1} - x_{1j})(x_{2j} - x_{1j}) + (y_{1,j+1} - y_{1j})(y_{2j} - y_{1j})}{l_j s_{1j}} \qquad (16)$$

$$p_j = (l_j^2 + s_{1j}^2 - 2l_j s_{1j} \cos \phi_j)^{\frac{1}{2}} \qquad (17)$$

$$\cos \beta_j = \frac{p_j^2 + l_j^2 - s_{1j}^2}{2 p_j l_j} \qquad (18)$$

$$\cos \lambda_j = \frac{p_j^2 + s_{2j}^2 - l_{j+1}^2}{2 p_j s_{2j}} \qquad (19)$$

$$\cos \nu_j = \frac{p_j^2 + s_{1j}^2 - l_j^2}{2 p_j s_{1j}} \qquad (20)$$

$$\cos \mu_j = \frac{p_j^2 + l_{j+1}^2 - s_{2j}^2}{2 p_j l_{j+1}} \qquad (21)$$

where $$0 \leq (\phi_j, \beta_j, \lambda_j, \nu_j, \mu_j) \leq \pi \qquad (22)$$

and where the nomenclature used with regard to the quadrilateral shown in FIG. 4 is as follows:
x = an axis
y = an axis coplanar with, and perpendicular to, said x axis $(x_{1j}, y_{1j})$ = a plane coordinate point of said quadrilaterial $(x_{2j}, y_{2j})$ = another plane coordinate point of said quadrilaterial $(x_{1,j+1}, y_{2,j+1})$ = still another plane coordinate point of said quadrilateral $(x_{2,j+2}, y_{2,j+2})$ = yet another plane coordinate point of said quadrilateral $S_{1j}$ = one side of said quadrilateral, with this side extending from coordinate $(x_{1j}, y_{1j})$ to coordinate $(x_{1,j+1}, y_{2,j+1})$ $l_j$ = another side of said quadrilateral, with this side extending from coordinate $(x_{1j}, y_{1j})$ to coordinate $(x_{2j}, y_{2j})$ $\phi_j$ = the angle bounded by sides $S_{1j}$ and $l_j$, and internal of said quadrilateral.

$p_j$ = diagonal of said quadrilateral, facing $\phi_j$, and extending from coordinate $(x_{1,j+1}; y_{1,j+1})$ to coordinate $(x_{2j}, y_{2j})$ $B_j$ = the angle bounded by side $l_j$ and diagonal $p_j$, and internal of said quadrilateral $V_j$ = the angle bounded by side $S_{1j}$ and diagonal $p_j$, and internal of said quadrilateral $\lambda_j$ = the angle internal of said quadrilateral, and bounded by diagonal $p_j$ and a side ($S_{2j}$) of said quadrilateral which extends from coordinate $(x_{2j}, y_{2j})$ to coordinate $(x_{2,j+1}; y_{2,j+1})$ $\mu_j$ = the angle internal of said quadrilateral, and bounded by diagonal $p_j$ and a side ($l_{j+1}$) of said quadrilateral which extends from coordinate $(x_{1,j+1}; y_{2,j+1})$ $\Omega_j$ = the angle bounded by $l_j$ and the x axis.

The mapping strip is next plotted according to the recursion laws $$X_{1,j+1} = X_{1j} + s_{ij} \cos(\phi_j + \Omega_j) \tag{23}$$

$$Y_{1,j+1} = Y_{1j} + s_{1j} \sin(\phi_j + \Omega_j) \tag{24}$$

where $$\Omega_{j+1} = \Omega_j + \phi_j + v_j = \mu_j - \pi \tag{25}$$

and $$X_{2,j+1} \times X_{2j} - s_{2j} \cos(\beta_j + \lambda_j - \Omega_j) \tag{26}$$

$$Y_{2,j+1} = Y_{2j} + s_{2j} \sin(\beta_j + \lambda_j - \Omega_j) \tag{27}$$

with $$X_{21} = X_{11} + l_1 \cos \Omega_1 \tag{28}$$

$$Y_{21} = Y_{11} + l_1 \sin \Omega_1 \tag{29}$$

The coordinates of the origin and orientation of the planar axes are necessary to implement the preceding equations. These values $(X_{11}{}^{(0)}, Y_{11}{}^{(0)}, \Omega_1{}^{(0)})$ are all arbitrary and were chosen as zero in the problem under study.

On completion of the mapping of one strip, the previous equations are re-cycled with new starting values in accordance with the following table:

| Old Function | New Function |
| --- | --- |
| $z_2$ | $z_1$ |
| $\theta_1(z_2)$ | $\theta_1(z_1)$ |
| $X_{11} + l_1 \cos \Omega_1$ | $X_{11}$ |
| $Y_{11} + l_1 \sin \Omega_1$ | $Y_{11}$ |
| $\Omega_1 - \beta_1 - \lambda_1 + \pi$ | $\Omega_1 + \phi_1$ |

This procedure leads to a dual representation of mapped points. Only those points which correspond to the top or bottom curves of the involute surface and those defined by $j = 1,2$ are uniquely determined. Discrepancies between the dual representations of single point are indicative of errors created due to the approximate development feature of the involute surface. Fortunately, in many examples, notably the case of small $\alpha$, these discrepancies are extremely small. In the present problem, for example, differences on the order of $10^{-5}$ in. occur.

As hereinbefore indicated, the flat ply pattern 20A generated by this approach is shown in FIG. 5.

As can be best seen in FIG. 6, the body of revolution 10, FIGS. 1 and 6, is a hollow symmetrical structure which comprises a plurality of a preselected number (e.g., 92) of identically shaped and sized exact involute plies 20, FIGS. 3 and 6, which are successively disposed and joined circumferentially in a contacting, stack-like layered, and overlapping relationship.

Adjacent identical plies 20, FIG. 6, of the plurality are circumferentially overlapped a distance d, FIG. 6, which is defined by the equation $$d(z) = 2\pi R_2(z)/N \tag{30}$$

where d,(z),$R_2$, and N are defined as hereinbefore.

As a matter of preference, the plies 20 are joined by bonding and/or laminating; and, each identical ply 20 is made of a matrix 30, FIG. 3, of graphite cloth which is reinforced with phenolic 31, and with the matrix 30 being impregnated with a pitch-furfural blend 32. The graphite reinforced impregnated cloth is then carbonized and graphitized.

As can be seen from FIGS. 1 and 6, the hollow symmetrical structure, which is in the form of a body of revolution 10, is useable as a part of a rocket nozzle and, more specifically, as an exit cone.

DESCRIPTION OF THE INVENTIVE METHOD

The preferred method of fabricating a hollow symmetrical structure, such as the body of revolution 10, FIGS. 1 and 6, essentially comprises the below-listed steps.

Firstly, forming a plurality of identically shaped and sized plies (such as 20, FIGS. 3 and 6).

Next, positioning a preselected number of the plurality of plies successively in alignment in a circumferential fashion and in a contacting stack-like layered relationship with each other, such that adjacent plies overlap each other by a predetermined distance, i.e., spacing (such as d, FIG. 6).

Lastly, joining the positioned plies together to form the hollow symmetrical structure.

This method may further comprise the additional step of determining the predetermined distance (i.e., spacing) by which adjacent plies overlap each other by use of the equation (3) hereinbefore set forth, i.e., $d(z) = 2\pi R_2(z)/N$.

More specifically, this is a method of fabricating a hollow symmetrical structure, in the form of a preselected body of revolution (such as 10, FIGS. 1 and 6) from a plurality of a predetermined number (such as 92) of identically shaped and sized plies (such as 20, FIGS. 3 and 6) made of a predesignated material (such as the aforesaid graphite reinforced impregnated cloth which comprises the matrix 30, FIG. 3, reinforced with phenolic 31, and impregnated with pitch-furfural blend 32), wherein the preselected body of revolution 10 has known inner and outer profile definations and limitation (such as in FIG. 1), an inner surface, an outer surface, a top surface, and a bottom surface, and wherein each of the plies 20 has a limiting sized thickness, a limiting sized width, and a length extending from the inner surface of the body of revolution to the outer surface thereof, and also wherein each of the plies must be positioned such that it (i.e., each ply) extends from the top surface of the body of revolution to the bottom surface thereof.

Also, the steps of this method may be (but need not be) more specifically described, as follows:

Firstly, determining an exact involute surface of each of the identical plies by use of the appropriate equations which have already been set forth hereinbefore.

Next, determining an inner edge of the exact involute surface of each of the identical plies by use of the appropriate equation which has already been set forth hereinbefore.

Then, determining an outer edge of the exact involute surface of each of the identical plies by use of the appropriate equation which already has been set forth hereinbefore.

Next, determining the limiting sized width of the exact involute surface of each of the identical plies by use of the appropriate equation which already has been set forth hereinbefore.

Then, determining a flat ply pattern (such as 20A, FIG. 5) of the determining exact involute surface of each of the now bounded identical plies by "developing" one of the exact involute surface bounded identical plies approximately by use of the appropriate equations which already have been set forth hereinbefore with respect to the quadrilateral shown in FIG. 4.

Next, forming the plurality of predetermined number of identically shaped and sized plies from te predesignated material, using the determined flat ply pattern.

Then, determining a distance (such as d, FIG. 6) by which the adjacent identical plies of the plurality are to circumferentially overlap, by use of the appropriate equation which already has been set forth hereinbefore.

Next, positioning the plurality of identically shaped and sized plies successively in alignment in a circumferential fashion and in a contacting, stack-like layered, and overlapping relationship, with each overlap being of the distance d which was previously determined.

Lastly, joining the plurality of positioned plies.

In this way, a hollow symmetrical structure, in the form of a preselected body of revolution (such as 10, FIGS. 1 and 6) is fabricated.

As a matter of preference, the step of joining the identical plies is accomplished by bonding and/or laminating the plies; and the predesignated material of which each ply is made comprises a matrix of graphite cloth, reinforced with phenolic, impregnated with a pitch-furfural blend, with the cloth then being carbonized and graphitized.

The hollow symmetrical body which is fabricated is useable as an exit cone of a rocket nozzle.

CONCLUSION

It is abundantly clear from all of the foregoing, and from th contents of the figures of the drawing, that the stated objects of the instant invention, as well as other objects related thereto, have been achieved.

Figure 8:
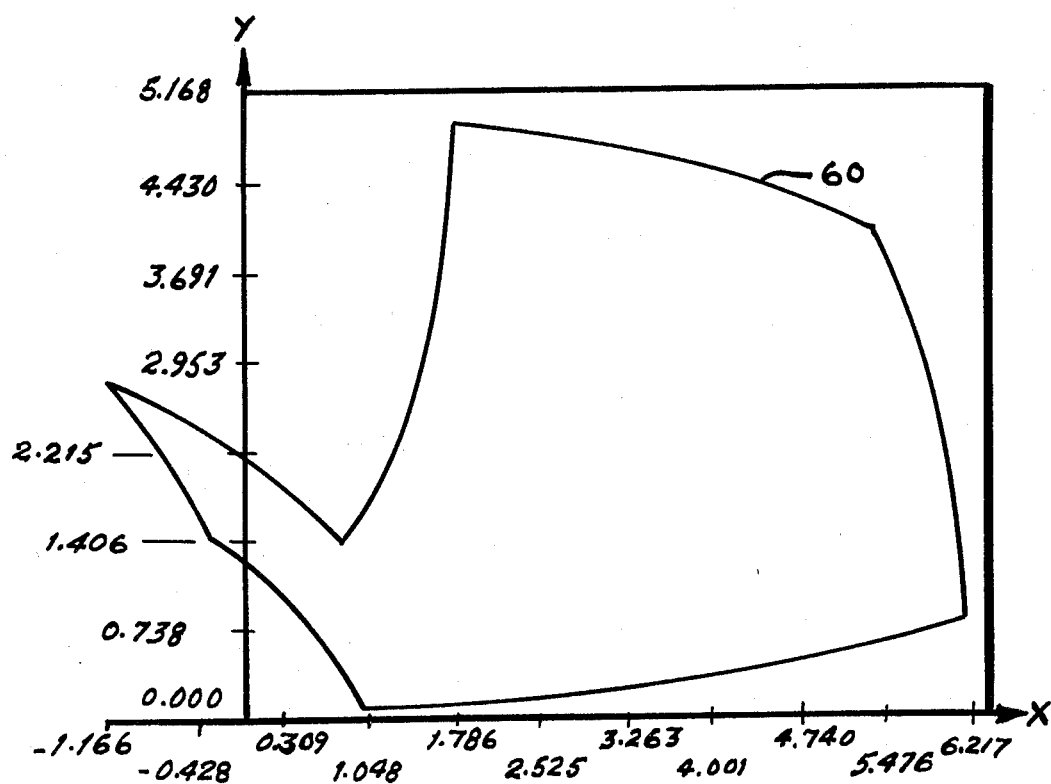
FIG. 8 is an exact involute ply pattern for another variation of the representative preferred embodiment, where the embodiment comprises 91 identically shaped and sized exact involute surface plies.
Figure 7:
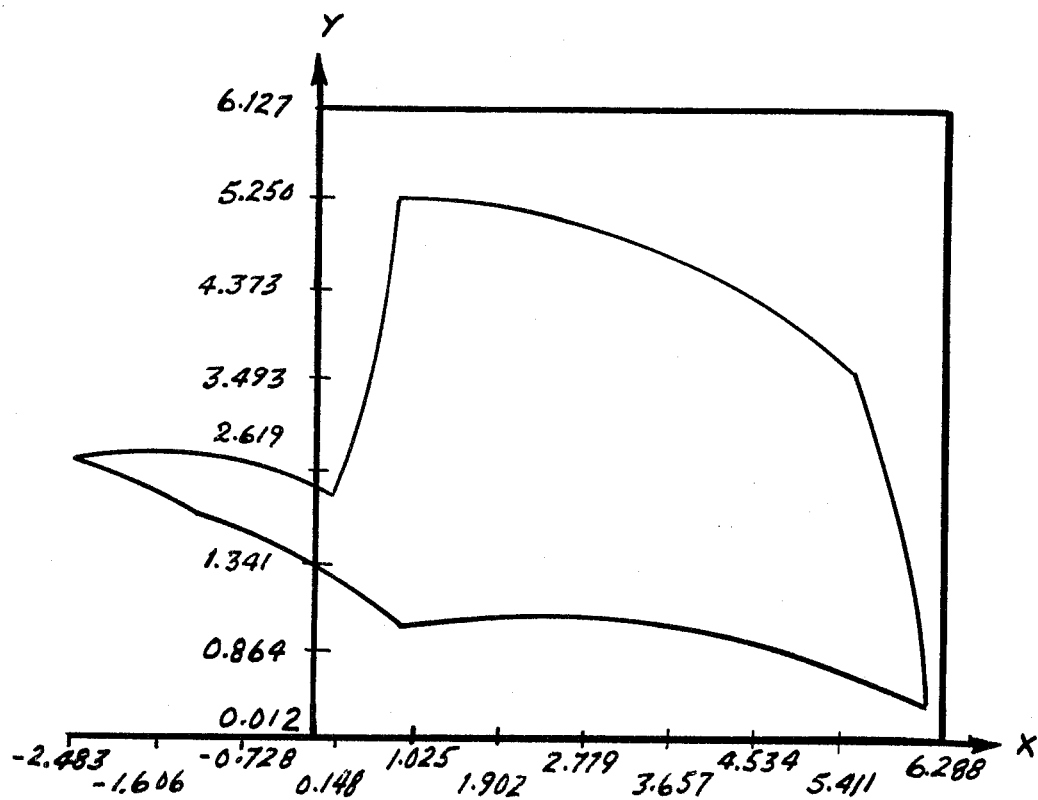
FIG. 7 is an exact involute ply pattern for a variation of the representative preferred embodiment, where the embodiment comprises 90 identically shaped and sized exact involute surface plies.

It is to be noted that, although there have been described and shown the fundamental and unique features of the instant invention as applied to a preferred embodiment 10, FIGS. 1 and 6, nevertheless various other embodiments, variations, adaptations, substitutions, additions, omissions, applications, and the like may occur to and can be made by those of ordinary skill in the art. For example, although the preferred embodiment 10 is constructed with the use of 92 identical plies, using the appropriate equations herein a flat ply pattern 50, FIG. 7, can be determined to construct the same preferred embodiment 10, using the same materials, but with 90 plies (i.e., N=90). Likewise, a flat ply pattern 60, FIG. 8, can be determined to construct the same preferred embodiment 10, using the same materials, but with 91 plies (i.e., N=91).

It is also to be noted that, because of the teachings herein, it may occur to others of ordinary skill in the art that, in appropriate particular circumstances, the number of the basic and fundamental steps of the inventive method can be increased, decreased, or otherwise varied, and/or that their sequence can be changed. In this regard, it is to be noted that, in spite of any variations in the number or sequence of the steps of the instant method, and same desired results will be obtained, nevertheless.

It is further to be noted that the success of structuring a hollow symmetrical structure in the form of a preselected body of revolution, or of performing the steps of the method of fabricating it, depends on the definition of the exact involute surface involved, in which minimal variations in tilt $\gamma$ should occur. In this regard, this angle is defined by $$\tan \gamma = Qc/\cos \alpha$$

and is nearly constant unless $\alpha$ is quite large.

What is claimed is:

1. A hollow symmetrical structure, in the form of a body of revolution, comprising a plurality of a preselected number of identically shaped and sized exact involute surface plies which are successively disposed and joined circumferentially in a contacting, stack-like layered, and overlapping relationship.

2. A hollow symmetrical structure, as set forth in claim 1, wherein said body of revolution has inner and outer profile definitions and limitations, an inner surface, an outer surface, a top surface, and a bottom surface, and wherein each exact involute surface ply of said plurality has a limiting sized thickness, a limiting sized width, and a length extending from said inner surface of said body of revolution to said outer surface of said body of revolution, with each said ply positioned such that it extends from said top surface of said body of revolution to said bottom surface of said body of revolution.

3. A hollow symmetrical structure as set forth in claim 2:

a. wherein said exact involute surface of each said ply is defined by the equations:

$r \sin \alpha = c$, where $r \geq c$ and $\theta(\alpha,z) - \bar{\theta}(z_o) = \bar{Q}(z-z_o) + \bar{\alpha}(z_o) + \cot \bar{\alpha}(z_o) - \bar{\alpha}(z) - \cot \bar{\alpha}(z)$ where $$Q = \sqrt{\frac{4\pi^2 c^2 - N^2 T^2}{NcT}} \ ;$$

b. wherein said exact involute surface of each said ply has an inner edge and an outer edge, and said inner edge is defined by the equation:

$\bar{\theta}_1(z) - \bar{\theta}_1(z_o) = Q(z-z_o) - \bar{\alpha}_1(z) - \cot \bar{\alpha}_1(z) + \bar{\alpha}_1(z_o) + \cot \bar{\alpha}_1(z_o)$ and said outer edge is determined by the equation:

$\bar{\theta}_2(z) - \bar{\theta}_1(z) = \bar{\alpha}_1(z) + \cot \bar{\alpha}_1(z) - \bar{\alpha}_2(z) - \cot \bar{\alpha}_2(z)$ where $R_i(z) \sin \bar{\alpha}_i(z) = c$; $i = 1,2$, and also c. wherein said limiting sized width of said exact involute surface of each said ply is defined by the equation:

$$s(z) = \frac{R_2^2(z) - R_1^2(z)}{2c},$$

where $\bar{s}(z) \leq w$;

wherein, in all applicable foregoing equations:
N = preselected number of plies
T = preselected limiting sized thickness of each ply
w = limiting sized width of each ply
c = involute constant, where $2\pi c \geq NT$
$r,\theta,z$ = radial, central angular, and axial coordinates, respectively
$\alpha$ = arc angle
$\gamma$ = tilt angle; $\tan \gamma = dr/dz$
s = arc length
$R_1(z), \bar{\theta}_1(z)$ = radial and central angular coordinates of inner edge of involute surface
$R_2(z), \bar{\theta}_2(z)$ = radial and central angular coordinates of outer edge of involute surface and, thereby said exact involute surface of each said identical ply, and boundaries of said surface, are defined and limited.

4. A hollow symmetrical structure, as set forth in claim 3, wherein a flat ply pattern of said defined and limited exact involute surface of each said bounded identical ply is developed approximately by the equations:

$s_{ij} = [(x_{1,j+1} - x_{1j})^2 + (y_{1,j+1} - y_{1j})^2]^{\frac{1}{2}}$ $l_j = [(x_{2j} - x_{1j})^2 + (y_{2j} - y_{1j})^2 + (z_2 - z_1)^2]^{\frac{1}{2}}$ $\cos \phi_j = \frac{(x_{1,j+1} - x_{1j})(x_{2j} - x_{1j}) + (y_{1,j+1} - y_{1j})(y_{2j} - y_{1j})}{l_j s_{1j}}$ $p_j = (l_j^2 + s_{1j}^2 - 2l_j s_{1j} \cos \phi_j)^{\frac{1}{2}}$ $\cos \beta_j = \frac{p_j^2 + l_j^2 - s_{1j}^2}{2p_j l_j}$ $\cos \lambda_j = \frac{p_j^2 + s_{2j}^2 l_{j+1}^2}{2p_j s_{2j}}$ $\cos \nu_j = \frac{p_j^2 + s_{1j}^2 l_j^2}{2p_j s_{1j}}$ $\cos \mu_j = \frac{p_j^2 + l_{j+1}^2 - s_{2j}^2}{2p_j l_{j+1}}$ where $0 \leq (\phi_j, \beta_j, \lambda_j, \nu_j, \mu_j) \leq \pi$ wherein said developed flat ply pattern is in the geometric shape of a quadrilateral;
and wherein:
x = an axis
y = an axis coplanar with, and perpendicular to, said x axis $(x_{1j}, y_{1j})$ = a plane coordinate point of said quadrilateral
$(x_{2j}, y_{2j})$ = another plane coordinate point of said quadrilateral $(x_{1,j+1}; y_{2,j+1})$ = still another plane coordinate point of said quadrilateral
$(x_{2,j+2}; y_{2,j+2})$ = yet another plane coordinate point of said quadrilateral
$S_{1j}$ = one side of said quadrilateral, with this side extending from coordinate $(x_{1j}, y_{1j})$ to coordinate $(x_{1,j+1}; y_{2,j+1})$
$1_j$ = another side of said quadrilateral, with this side extending from coordinate $(x_{1j}, y_{1j})$ to coordinate $(x_{2j}, y_{2j})$
$\phi_j$ = the angle bounded by sides $S_{1j}$ and $1_j$, and internal of said quadrilateral.
$p_j$ = diagonal of said quadrilateral, facing $\phi_j$, and extending from coordinate $(x_{1,j+1}; y_{1,j+1})$ to coordinate $(x_{2j}, y_{2j})$
$B_j$ = the angle bounded by side $1_j$ and diagonal $p_j$, and internal of said quadrilateral
$V_j$ = the angle bounded by side $S_{1j}$ and diagonal $p_j$, and internal of said quadrilateral
$\lambda_j$ = the angle internal of said quadrilateral, and bounded by diagonal $p_j$ and a side ($S_{2j}$) of said quadrilateral which extends from coordinate $(x_{2j}, y_{2j})$ to coordinate $(x_{2,j+1}; y_{2,j+1})$
$\mu_j$ = the angle internal of said quadrilateral, and bounded by diagonal $p_j$ and a side ($1_{j+1}$) of said quadrilateral which extends from coordinate $(x_{1,j+1}; y_{2,j+1})$
$\Omega_j$ = the angle bounded by $1_j$ and the x axis.

5. A hollow symmetrical structure, as set forth in claim 4, wherein adjacent identical plies of said plurality are circumferentially overlapped a distance d which is defined by the equation:

$d(z) = 2\pi R_2(z)/N$ where:
$d(z), R_2$, and N are defined as hereinbefore.

6. A planar symmetrical structure, as set forth in claim 1, wherein said successively circumferentially disposed and joined identical plies are joined by bonding.

7. A hollow symmetrical structure, as set forth in claim 5, wherein each said identical ply is made of a matrix of graphite cloth reinforced with phenolic, which said matrix is impregnated with a pitch-furfural blend, carbonized, and graphitized.

8. A hollow symmetrical structure, as set forth in claim 1, wherein said structure is for use as part of a rocket nozzle.

9. A hollow symmetrical structure, as set forth in claim 8, wherein said part of said rocket nozzle is an exit cone.

10. A hollow symmetrical structure, as set forth in claim 9, wherein said preselected number of identical plies is 92.

11. A method of fabricating a hollow symmetrical structure in the form of a preselected body of revolution, comprising the steps of:
  a. forming a plurality of identically shaped and sized plies;
  b. positioning a predetermined number of said plurality of plies successively in alignment in a circumferential fashion and in a contacting, stacked-like layered relationship with each other, such that adjacent plies overlap each other by a predetermined distance; and
  c. joining said positioned plies together.

12. A method of fabricating a hollow symmetrical structure in the form of a body of revolution, as set forth in claim 10, comprising the step of determining said predetermined distance by the following equation:

$$d(z) = 2\pi R_2(z)/N$$

wherein
  $d$ = said predetermined distance
  $N$ = said predetermined
  $R_2(z)$ = radial coordinates of outer edge of each of said plies.

* * * * *